United States Patent [19]

Kobayashi et al.

[11] Patent Number: 4,794,809

[45] Date of Patent: Jan. 3, 1989

[54] STEERING GEAR MECHANISM

[75] Inventors: Kazuyoshi Kobayashi; Teruo Koyama; Takitaro Fukuda, all of Okazaki, Japan

[73] Assignee: Mitsubishi Jidosha Kogyo Kabushiki Kaisha, Tokyo, Japan

[21] Appl. No.: 753,614

[22] Filed: Jul. 9, 1985

[30] Foreign Application Priority Data

Jul. 9, 1984 [JP] Japan .................. 59-102532[U]
Jul. 14, 1984 [JP] Japan .................. 59-106736[U]
Jun. 7, 1985 [JP] Japan .................. 60-85298[U]

[51] Int. Cl.⁴ ............................................. B62D 3/12
[52] U.S. Cl. ...................................... 74/422; 74/498
[58] Field of Search ............... 74/498, 422, 89.17; 180/147, 148; 280/96

[56] References Cited

U.S. PATENT DOCUMENTS

| 4,215,591 | 8/1980 | Bishop | 74/422 |
| 4,322,986 | 4/1982 | Adams et al. | 74/422 |
| 4,444,070 | 4/1984 | Yanai | 74/498 |
| 4,448,088 | 5/1984 | Adams | 74/422 |
| 4,475,413 | 10/1984 | Higuchi | 74/422 |

FOREIGN PATENT DOCUMENTS

| 51665 | 4/1980 | Japan | 74/422 |
| 69155 | 4/1982 | Japan | 74/422 |
| 200857 | 11/1983 | Japan | 74/422 |

Primary Examiner—Allan D. Herrmann
Attorney, Agent, or Firm—Wenderoth, Lind & Ponack

[57] ABSTRACT

A steering gear mechanism has in combination a housing, a pinion shaft rotatably in the interior of the housing and provided with a pinion thereon; a slidable rack bar guided the housing and formed on one surface thereof with a rack adapted to operatively engage with the pinion, and a friction device adapted to give rise to a relatively large frictional force in the directions of sliding motion of the rack bar in the neutral steering position, while giving rise to a relatively small frictational force in the same direction of sliding motion within the normal range of the steering operation of the rack bar.

1 Claim, 6 Drawing Sheets

STEERING GEAR MECHANISM

BACKGROUND OF THE INVENTION

1. Field of the Invention

The present invention relates generally to an improvement relating to a steering gear mechanism, and more particularly to an improved steering gear mechanism principally for use with an automotive vehicle.

2. Description of the Prior Art

Referring to the typical construction of a conventional steering gear system as shown in FIGS. 7 and 8, this system generally comprises a pinion shaft a connected operatively to a steering wheel of an automotive vehicle by way of a steering joint not shown, an oil seal at b, a top cover at c, a lock nut at d, a ball bearing at e and a needle bearing at f which are disposed to rotatably support the pinion shaft in the interior of a rack housing g, respectively, a rack bar at h having a rack portion $h_1$ engaged with a pinion $a_1$ provided on the pinion shaft a, a rack support at i provided in the rear side of the rack bar h, a rack support cover at l, a lock nut at k adapted to fix the rack support cover l in position in the rack housing g, a coil spring at j mounted between the rack support cover l and the rack support i, and tie rods at m, m connected operatively with and extending outwardly from the rack bar h in the both right and left directions. The steering gear mechanism with this typical construction is designed to operate in such a manner that the pinion shaft may firstly be caused to be rotated about its axis by way of the steering wheel of an automobile, this rotation motion being converted to a linear motion in the direction Z through the operative engagement between the pinion $a_1$ on the pinion shaft a and the rack bar h, this motion of the rack bar h being then relayed through the right and left tie rods m, m to corresponding steering wheels of the vehicle, thus having these steering wheels shifted in steering motion to a desired direction of the vehicle to be turned, accordingly.

According to such a typical construction of the steering mechanism, it is known that there would generally occur reaction forces from the physical engagement between the rack $h_1$ and the pinion $a_1$ not only in the direction Z of the tie-rod extensions but also in the direction X and Y of the axis of pinion shaft and of the axis extending in the orthognal direction thereto, thus making the efficiency of transmission decreased substantially under the effect of an engagement between the gears' teeth, an elastic deformation in members involved, frictional losses, and the like, among which friction produced as a result of sliding motion between of the rack bar h and the rack support i rendered by a component of force in the direction Y noted above is one of decisive factors in terms of the reduction in transmission efficiency.

Now, reviewing more specifically the effect of this sliding friction existing in the mutual engagement between the rack bar h and the rack support i, assuming a coefficient of friction as $\mu_{89}$ and a component of force in the direction Y as FY, a friction force $F_{89}$ may be given by the following equation; that is, $$F_{89} = \mu_{89} \times FY$$

When the rack bar h and the rack support i are placed in an operative engagement relationship with each other as noted above, there is a relationship between a steering force from the steering wheel of a vehicle and a steering angle as shown by an arrow A in FIG. 5. Consequently, a counter sliding frictional force existing between the rack bar h and the rack support i (a steering reaction force existing in the entire steering system) is shown by an arrow A in FIG. 6.

On the other hand, referring to the general requirement in the design of a steering gear system, it is known that there are three principal factors of performance; that is, (1) a requirement of only a small force for a steering operation while the vehicle is standing still and for a large angle steering operation; (2) an exhibition of a proper damping of forces such as friction in or around the neutral position of steering and the like for reducing self-excited vibration (the so-called shimmy vibration) in the steering system; and (3) responsiveness having a feeling of reluctance in or near the neutral position rather than a too much ease in responsiveness during high-speed steering, thus requiring an appropriate extent of rigidity in or near the neutral position of steering of a vehicle.

It is known, however, that the steering system of the conventional construction as shown in FIGS. 5 and 6 would generally suffer from the following drawbacks as apparent from the performance represented in FIGS. 7 and 8. They are: (1) the occurrence of the so-called shimmy condition in the steering system (with the damping forces to damp the vibrations becoming reduced accordingly by a reduction in the coefficient of friction $\mu_{89}$ reviewed) for having steering power decreased during a steering operation while standing or for a relatively large angle of steering, together with a elimination of the reluctant feeling in a high-speed steering operation, thus resulting in a reduction in the proper responsiveness to steering; and (2) on the contrary, an increase in the steering power required in the steering operation while standing and for a relatively large angle of steering by an increase in the coefficient of friction $\mu_{89}$ or an urging force of the spring j for having the shimmmy conditions decreased and for having an improved property of responsiblity to a high-speed steering operation.

As reviewed fully hereinbefore, when the steering power required is designed to be reduced by decreasing the coefficient of friction, there may inevitably occur the problem of shimmy conditions, and when increasing the coefficient the result is in an increase in the steering power required. In order to cope with such a vicious circle in the design of the steering system, according to the common construction of the steering gear mechanism, it has been the practice that there is employed a certain compromise in the frictional force at the expense of reducing the steering power required.

In consideration of such drawbacks particular to the conventional steering gear mechanism as noted above, it has long been a desire to attain an efficient resolution for overcoming such inevitable problems particular to the conventional steering gear construction.

The present invention is essentially directed to the provision of a due and proper resolution to such inconveniences and difficulties in practice as outlined above and experienced in the conventional steering gear mechanism to by have been left unattended with any proper countermeasures therefor.

SUMMARY OF THE INVENTION

It is therefore a primary object of the present invention to provide an improvement in or relating to a steering gear mechanism for use with an automotive vehicle, which can afford a substantial reduction in a steering force required for a steering operation while the vehicle is standing still and for a relatively large angle of steering.

It is another object of the invention to provide an improved steering gear mechanism which can reduce the so-called shimmy conditions substantially, while ensuring a proper reluctance to steering in a high-speed steering operation.

It is still another object of the invention to provide an improved steering gear mechanism which can operate with ease and smoothness in the whole range of steering angles.

The above objects of the invention can be attained efficiently from the improvement relating to the steering gear mechanism for use with an automotive vehicle, which comprises, as summarized in brief, in combination a housing, a pinion shaft mounted rotatably in the interior of the housing and provided with a pinion thereon; a slidable rack bar being guided in the housing and formed on one surface thereof with a rack adapted to operatively engage with the pinion, and friction means adapted to give rise to a relatively large frictional force in the directions of sliding motion of the rack bar in the neutral steering position, while giving rise to a relatively small frictional force in the same directions of sliding motion within the normal range of steering operation of the rack bar.

The principle, nature and details of the present invention will, as well as advantages thereof, become more apparent from the following detailed description by way of a preferred embodiment of the invention, when read in conjunction with the accompanying drawings, in which like parts are designated by like reference numerals.

DETAILED DESCRIPTION OF THE PREFERRED EMBODIMENTS

The present invention will now be described in detail by way of example, but is not to be restricted in any way to the preferred embodiments thereof, in conjunction with the accompanying drawings, as follows.

Figure 2:
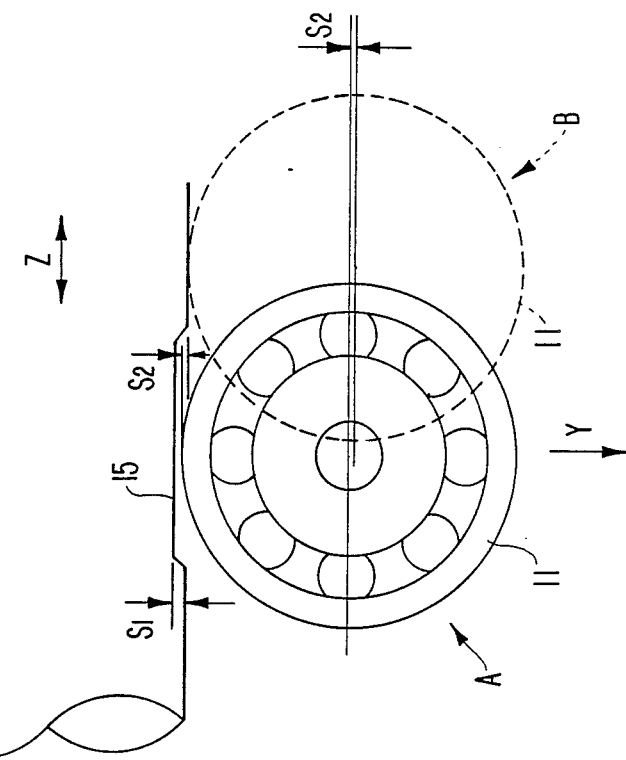
FIG. 2 is a fragmentary enlarged plan view taken along the plane designated by II in FIG. 1.
Figure 1:
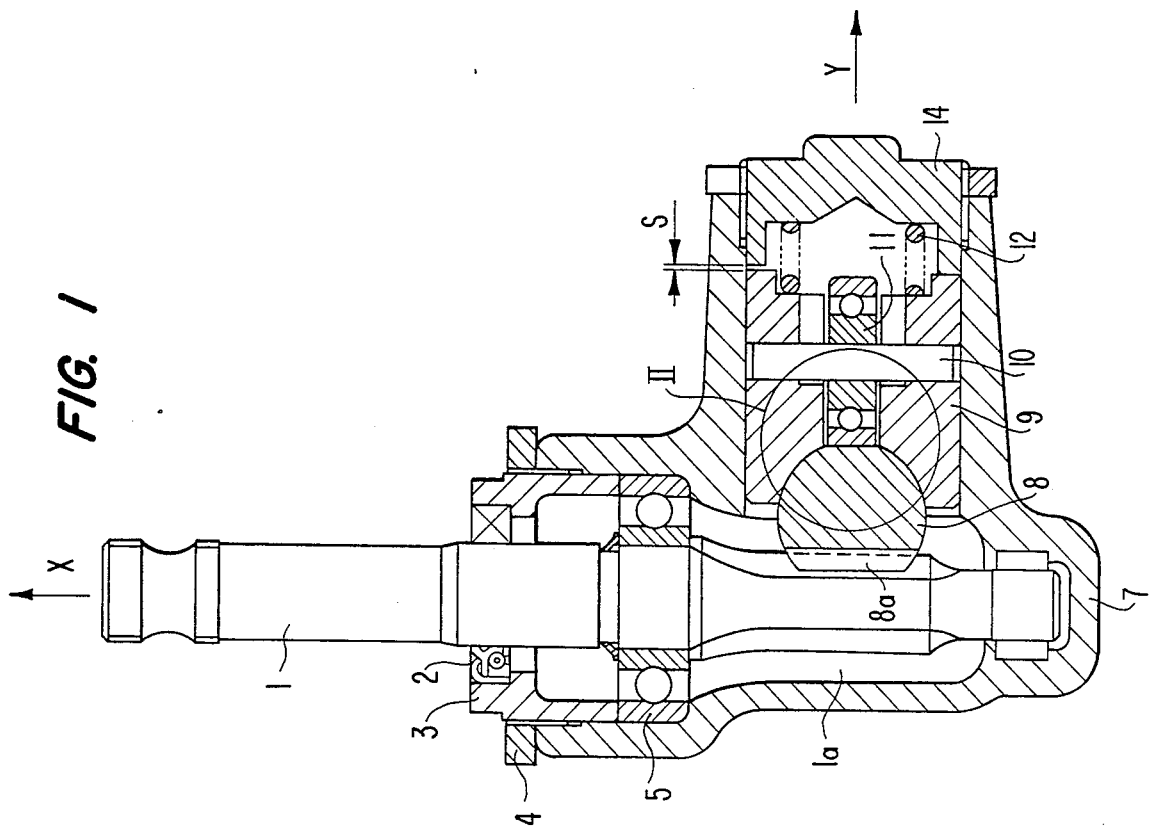
FIG. 1 is a longitudinal cross-sectional view showing the general construction of a steering gear mechanism by way of a preferred embodiment of the present invention.

Now, referring firstly to FIGS. 1 and 2, there is shown, according to a first preferred embodiment of the present invention, the general construction, in longitudinal profile, of a steering gear mechanism provided with a pinion shaft 1, a pinion 1a, an oil seal 2, a top cover 3, a lock nut 4, a ball bearing 5, a needle bearing 6, a rack housing 7, a rack cover 8, a rack portion 8a, a rack support 9, a shaft 10 supporting a bearing 11, a coil spring 12, a lock nut 13, rack support cover 14, and a recess 15 defined in the rear surface of the rack bar 8. There is designated at $\delta$ a clearance between the rack support 9 and the rack support cover 14, a depth $\delta_1$ of the recess 15, an extent of overlapping $\delta_2$ with the bearing 11 other than the recess 15 when the rack bar 8 is in the neutral position, with the extent of overlapping $\delta_2$ being set generally equal with the clearance (shifting motion of the bearing 11), and with the depth $\delta_1$ being set to be greater than the extent of overlapping $\delta_2$. Also, the coefficient of friction of a sliding frictional area existing between the rack bar 8 and the rack support 9 is preset at $\mu_{89}$ (approximately 0.1 to 0.2), and a coefficient of rolling friction in the area of rolling friction between the rack bar 8 and the bearing 11 is set to $\mu_{811}$ (0.04 or less), respectively. In other words, it is to be noted that the material and surface finish of each of the members mentioned above are selected to obtain such coefficients of friction as noted above. In addition, it is further arranged that the pinion shaft 1 connected operatively to the steering wheel by way of a steering joint not shown is mounted rotatably in a rack housing 7 by the ball bearing 5 and the needle bearing 6, and that the upper part of the rack housing 7 is hermetically sealed by way of. The oil seal 2, the bearing 11 is supported rotatably upon the rack support through the shaft 10. The rack bar 8 engaged in meshing relationship with the pinion on the pinion shaft 1 is held movably in linear motion in the axial direction by the rack support 9, and the coil spring 12 is mounted in position to urge the rack bar 8 against the pinion on the pinion shaft 1 by way of the rack support 9.

Referring now to the operation of the steering gear mechanism by way of the preferred embodiment shown in FIGS. 1 and 2, in the neutral position, the rack bar 8 will come into contact with the rack support 9 only, with the coefficient of sliding friction being $F_{89} = \mu_{89} \times FY$, as in the conventional construction. When in the steering position, the rack bar 8 is caused to be moved in either way of the direction Z. In other words, the ball bearing 11 will then be at a relative position with respect to the rack bar 8 as shown by a broken line in FIG. 2. As a consequence, it is seen that the ball bearing 11 and the shaft 10 and the rack support 9 are caused to travel in linear motion by a distance $\delta_2$ in the direction Y, thus causing the rack bar 8 and the rack support 9 to move of engagement with each other (with the support yoke and the bearing shaft being lowered together). With this arrangement, a current force of rolling friction during the steering operation may now be given by the following equation; that is, $$F_{811} = \mu_{811} \times FY$$

Figure 6:
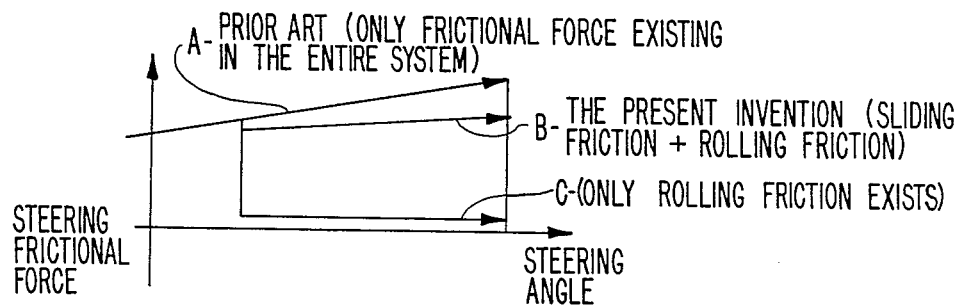
FIG. 6 is a similar schematic illustration showing a frictional force rendered upon a rack bar comparing of the present invention with the prior art.

As stated hereinbefore, with a relationship of $\mu_{811} << \mu_{89}$, the frictional force in the steering operation will be that shown by arrow C in FIG. 6.

Figure 5:
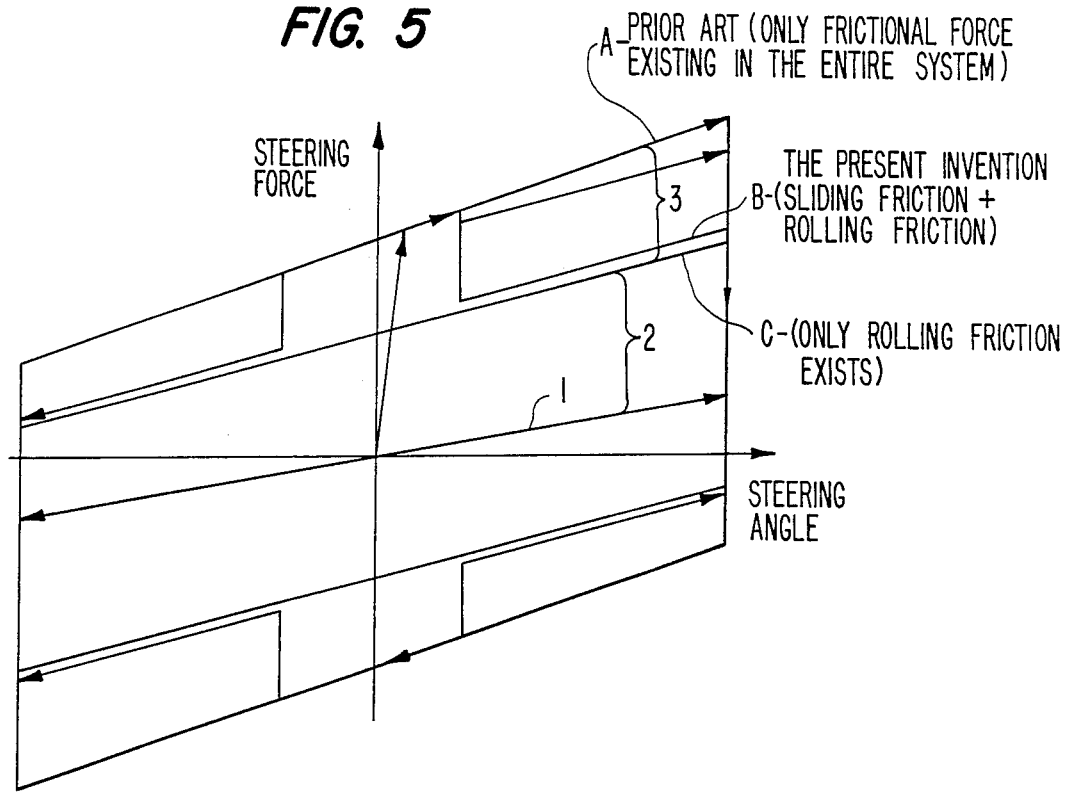
FIG. 5 is a schematic illustration showing the relationship between a steering force and a steering angle in the steering system comparing the present invention with the prior art.

Now, according to FIG. 5, there are shown schematically a property in the idealistic condition designated at the reference numeral 1 where there no ground friction exists on a tire and no steering friction exists, a property with a ground friction at exists on a tire, and a property with a steering friction at 3, respectively.

Next, the present invention will be described further referring to another or second embodiment thereof in conjunction with FIGS. 3 and 4. According to this embodiment, there is a recess 15 in an area which corresponds to the neutral zone N in the rear cylindrical surface 8b of the rack bar 8, with a flat area 8b' corresponding to the both steering operation areas being displaced by a distance $\delta_1$ relative to the ball bearing 11 placed in a working position. Also, there is a bearing support 16 in a space defined by a rack support 9 and a rack support cover 14, and a friction-less bearing such as a ball bearing 11 on the same bearing support 16 by way of a shaft 10. It is to be noted that the central axis of the shaft 10 extends parallel to the axis of the pinion shaft 1. Also there is a coil spring 17 between the bearing support 16 and the rack support 9.

Figure 4:
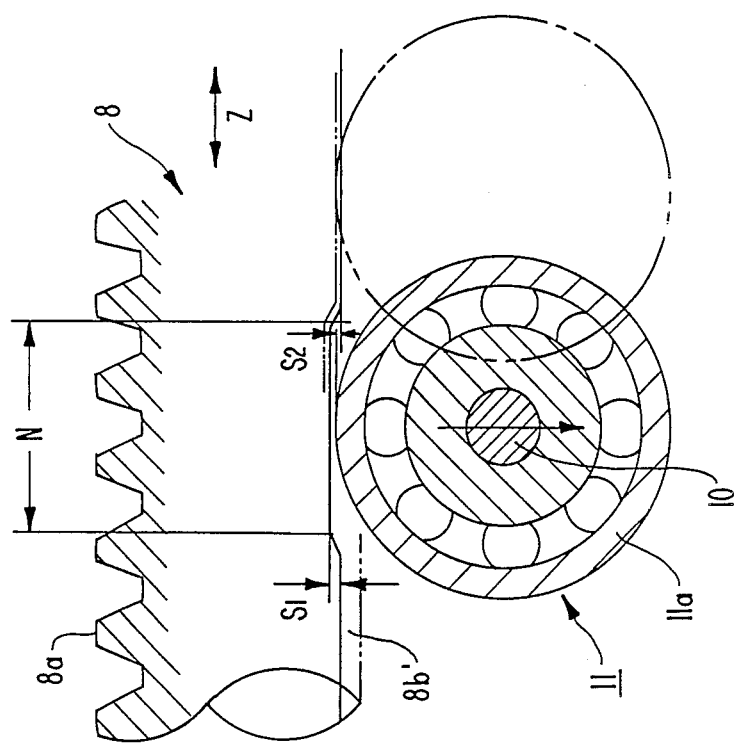
FIG. 4 is a longitudinal cross-sectional view taken along the plane shown by an arrow IV—IV in FIG. 3.

Now, as apparent from FIG. 4 showing the neutral position of the rack bar 8, there is seen existing an extent of overlapping of $\delta_2$ in the direction Y which is orthogonal to the axis of the rack bar 8 between the rear side flat area 8b' and the outer race 11a of the ball bearing 11. As the values of $\delta_1$ and $\delta_2$ are preset to be $\delta_1 > \delta_2$, and when the rack bar 8 is in its neutral position, it is seen that there exists a small gap of $(\delta_1 - \delta_2)$ between the recess 15 in the rear neutral area of the rack bar 8 and the ball bearing 11, accordingly.

Figure 3:
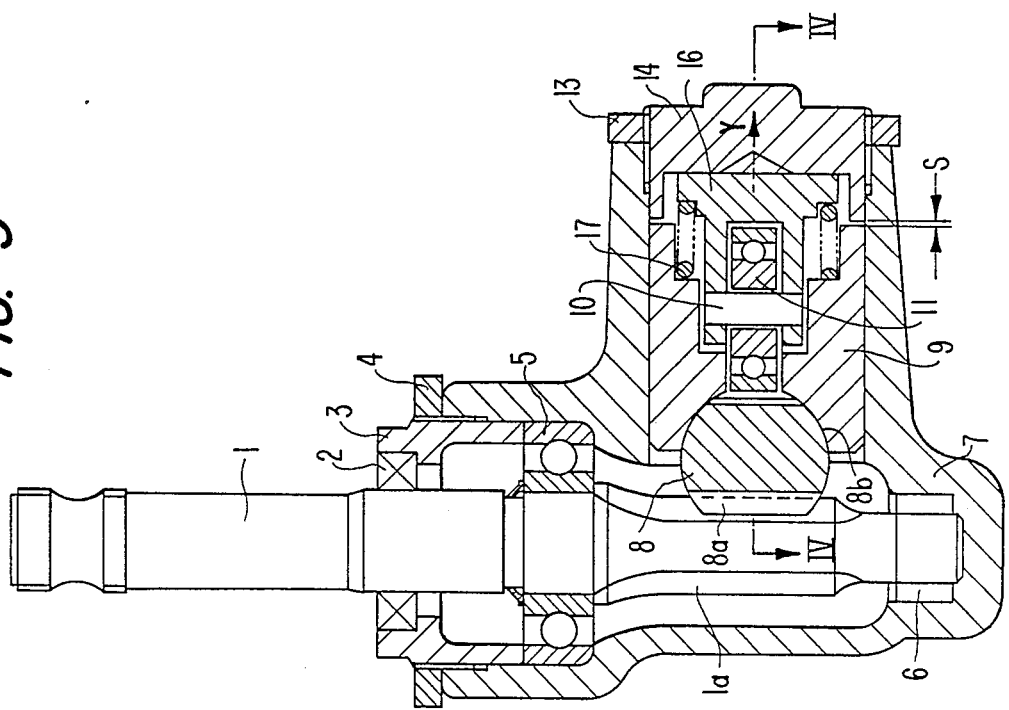
FIG. 3 is a similar longitudinal cross-sectional view to FIG. 1 showing another embodiment of the invention.
Figure 7:
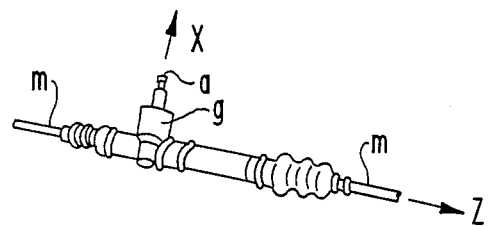
FIG. 7 is a perspective view showing the general appearance of a typical prior art steering gear mechanism.
Figure 8:
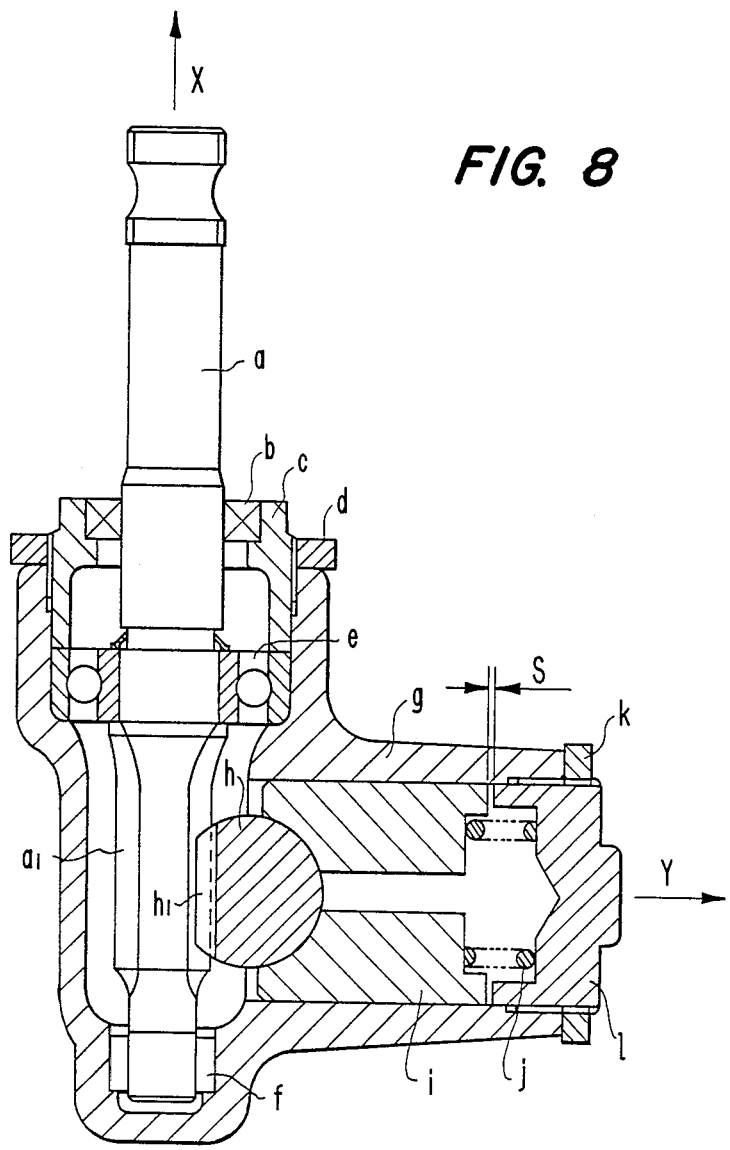
FIG. 8 is a longitudinal cross-sectional view showing the detail of a steering gear mechanism shown in FIG. 7.

Now, reference is made to the operation of the steering gear mechanism shown in FIGS. 3 and 4. As reviewed hereinbefore in conjunction with the conventional steering gear system shown in FIGS. 7 and 8, it is known that effects of reacting forces would occur from the operative engagement between the rack $h_1$ and the pinion $a_1$ not only in the direction Z but also in the directions X and Y, whereby the efficiency of power transmission at the rack $h_1$ and pinion $a_1$ (hence, the entire steering gear system) would be reduced due to such factors as the meshing engagement of these members, the elastic deformation, the frictional forces of the engagement, and the like, among which there is a governing factor causing a reduction in the efficiency of transmission, that is a sliding friction as observable in the engagement of the rack bar h with the rack support i.

Now, assuming a coefficient of sliding friction between the rack bar h and the rack support i is $\mu_{89}$, and a component of force in the direction Y being FY, a force of sliding force at this engagement $F_{89}$ may be given by the following equation; that is, $$F_{89} = \mu_{89} \times FY$$

When the rack bar h and the rack support i are placed in operative engagement with each other, it is known that the relation between the steering force and the steering angle is as shown by an arrow A in FIG. 5, and consequently, the force of sliding friction existing in the engagement between the rack h and the rack support i (i.e., the reactive steering force of the entire steering system) will then be as shown by the arrow A in FIG. 6.

In contrast, according to the advantages construction of the invention, it is to be noted that when the rack bar 8 is in or near its neutral position, there is defined a small gap of $(\delta_1 - \delta_2)$ between the recess 15 of the rack bar 8 and the ball bearing 11, and that the rack bar 8 would contact with the rack support 9 alone, thus resulting in a force of sliding friction of ($F_{89} = \mu_{89} \times FY + F_o$, where $F_o$ is a frictional force effected by spring force $P_o$ and given by the following equation; that is, $F_o = \mu_{89} \times P_o$), which is identical with the conventional construction, and that when in the steering position, the rack bar 8 would then move in the direction Z, thus causing the ball bearing 11 to be shifted to a position shown by a two-dot chain line in FIG. 4 with respect to the rack bar 8. As a consequence, therefore, the flat area 8b' of the rack bar 8 will then contact with the ball bearing 11 and bringing the rack support 9 either into engagement with the rack bar 8, accordingly. With this construction, a force of friction generated during a steering operation as obtained from the combination of a current force of sliding friction and a current force of rolling friction will now be given by the following equation; that is, $$F'_{89} = \mu_{89} \times P_o$$

$$F_{811} = \mu_{811} \times FY$$

However, as the value $F'_{89}$ would only change by a displacement corresponding to the value of $\delta_2$ with respect to $F_o$, it is admittable $F'_{89} \approx F_o$. From this, a total force of friction F may be;

$$F = F'_{89} + F_{811} \approx F_o + \mu_{811} \times FY$$

thus, obtaining the property as shown by B in FIGS. 5 and 6, accordingly.

Now, according to this embodiment, by virtue of such an advantageous construction that the rack support 9 and a friction-less bearing, for instance, the ball bearing 11 are mounted independent from each other, the extent of overlapping noted above may be adjusted substantially to as high of a precision as is desired, by screwing the rack support cover 14 until the outer race 11a of the bearing 11 abuts against the recess 15 in the neutral area N of the rack bar, and then by screwing back to a given appropriate extent, accordingly. As a consequence, therefore, once the depth of stepping $\delta_1$ of the recess 15 is set with a desired accuracy, a total precision control upon the group of relative parts will be attained in practice, irrespective of the individual members such as the rack support 9, the pinion shaft 1, the bearing support 16 and the rack support cover 14, at all. Furthermore, only if the condition with respect to a rate of wear or abrasion $\Delta W$ of the flat area 8b' of the rack bar 8 and the ball bearing 11, that is $(\delta_1 - \Delta W > \delta_2)$ is met, it is feasible in practice to make an appropriate adjustment of the value $\delta_2$, thus making it possible to have the value $\delta_2$ maintained to be constant, accordingly. In addition, by virtue of such an advantageous effect that the center of engagement between the rack bar 8 and the pinion shaft 1 may be shifted towards the pinion side by the value of $\delta_2$ during a steering operation, there is attainable such an additional effect that the steering force may be reduced to a small extent.

Effect and Function of the Invention

As fully reviewed in the specific embodiments of the invention taken by way of example hereinbefore, it is to be noted that there is provided an improved construction of a steering gear mechanism, which comprises, in combination, housing means; pinion shaft means rotatably mounted in the the housing means and provided with a pinion thereon; rack a slidable bar means being guided in the housing means and formed on one surface thereof with a rack adapted to operatively engage with the pinion, and friction means adapted to give rise to a relatively large frictional force in the directions sliding motion of the rack bar means in the neutral steering position, while exhibiting a relatively small frictional force in the same directions of the sliding motion within the normal range of steering operation of said rack bar means.

With such an advantageous construction according to the present invention, there may be attained a substantial effect and function such that a force of steering friction may be generated as shown by arrow B in FIG. 6. A substantial reduction in the steering force is realized when the vehicle is standing still and when it is in the normal running state, and a substantial reduction in the so-called shimmy conditions in and near the neutral position of steering as in the conventional steering system is ensured while having a substantial reluctancy (a stiff steering or resisting feeling) in the steering operation is provided while the vehicle is running at a high speed. With a value of clearance $\delta$ between the rack support and the rack support cover and of overlapping $\delta_2$ between the area other than the recess and the bearing position, when the rack bar is in or near the neutral position, being determined to be $(\delta > \delta_2)$, and with a large steering force, the rack bar may operatively shift towards the rack support until the value $\delta = 0$ is realized under the effect of the resilience on the part of the rack bar, thus resulting in a shift in the point of engagement. With the values of $\delta$ and $\delta_2$ preset in the reverse order, that is $\delta < \delta_2$, the rack bar would then result in an improper position like in the behavior occurring with an undesired negative displacement, and in this consideration, the advantageous aspect according to the present invention can now afford a due effect of absorbing an amount of overlapping (of a shift of the rack bar) $\delta_2$ by the clearance $\delta$, thus eventually making the point of engagement between the rack bar and the pinion substantially constant throughout the entire range of steering angles, and thus affording an easy and smooth steering motion throughout all the areas of steering angles, accordingly.

What is claimed is:

1. A steering gear mechanism comprising:

a housing;

a shaft rotatably mounted within said housing and having a pinion fixed thereon;

a rack bar slidably mounted within said housing and having a rack on one side thereof engaging said pinion and driven by said pinion for sliding said rack bar within said housing, said rack being driven by said pinion to slide said rack bar over a steering range defined by two steering operation areas and a neutral steering area between said two steering operation areas, and said rack bar having a recess in the surface thereof opposite said rack;

first support means within said housing and abutting said rack bar when at said neutral steering area for supporting said rack bar when at said neutral steering area and for imparting a first force to said rack bar when said rack bar slides at said neutral steering area, said first force acting on said rack bar in a direction opposite to that in which said rack bar slides when at said neutral steering area for establishing a first resistance to the sliding of said rack bar when at said neutral steering area; and second support means within said housing and abutting said rack bar when at either of said two steering operation areas for supporting said rack bar when at either of said two steering operation areas and for imparting a second force to said rack bar when said rack bar slides at either of said two steering operation areas, said second force acting on said rack bar in a direction opposite to that in which said rack bar slides when at either of said two steering operation areas for establishing a second resistance to the sliding of said rack bar when at either of said two steering operation areas, said first support means and said second support means comprising a rack support within said housing, said rack support slidable in a direction perpendicular to the direction in which said rack bar extends and biased against said rack bar for slidably guiding said rack bar when at said neutral steering area and when at said two steering operation areas, a spring within said housing for biasing said rack support against said rack bar, and a rotatable bearing having a shaft extending parallel to said pinion shaft and fixed relative to said housing and having a rotatable bearing member rotatably mounted to said shaft of said rotatable bearing and extending into said recess by an amount that is less than the depth of the recess such that when said rack bar is at said neutral steering area only said rack support supports said rack bar and when said rack bar is at either of said two steering operation areas said rack bar engages said rotatable bearing member and is urged toward said pinion thereby and said rack support slides under the influence of said spring to remain in a supporting relationship with said rack bar, and said first force being of such a magnitude that shimmy-vibrations imparted to the rack bar when at said neutral steering area are inhibited, and said first force being greater than said second force whereby a driving force exerted by said pinion that is required to slide said rack bar when at either of said two steering operation areas is less than that when said rack bar is at said neutral steering area.

* * * * *